Patented June 21, 1932

1,863,763

UNITED STATES PATENT OFFICE

IWAN OSTROMISLENSKY, OF NEW YORK, N. Y., ASSIGNOR TO OSTRO PRODUCTS CORPORATION OF AMERICA, OF NEW YORK, N. Y., A CORPORATION OF NEW JERSEY

HYDRAZO COMPOUNDS AND METHOD OF PREPARATION

No Drawing.   Application filed June 1, 1928.   Serial No. 282,275.

This invention relates to new chemical compounds, more particularly to compounds having valuable medicinal properties, and to the method of preparing the same.

An object of the invention is to provide new chemical compounds for use in the arts and sciences.

Another object is to provide a method of preparing the compounds.

Still another object is to provide a new medical preparation of increased germicidal, and particularly spirochaetocidal and trypanosomocidal powers.

In one method of carrying out the invention a commercial dye stuff having the German name of "Dianilblau H6G" and known in the United States as "Amanil Skyblue R. (520) conc.", and comprising the group—

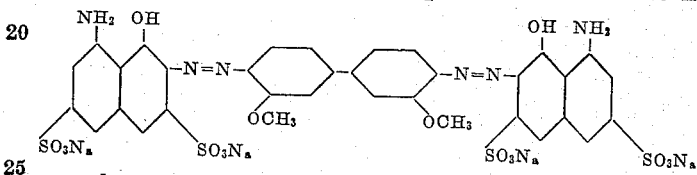

may be used in forming the preferred compound of my invention. The above material, as shown by the formula, is an oxymethyl derivative of benzidine, diazotized and coupled with the sodium salt of H-acid.

Upon boiling 40 gms. of this dye stuff in 350 cc. water with 31 gms. purified sodium-formaldehydesulphoxylate under a reflux condenser until the blue color disappears, the above compound is reduced and a new compound is obtained which analysis shows belongs to the hydrazo compounds and may have the formula—

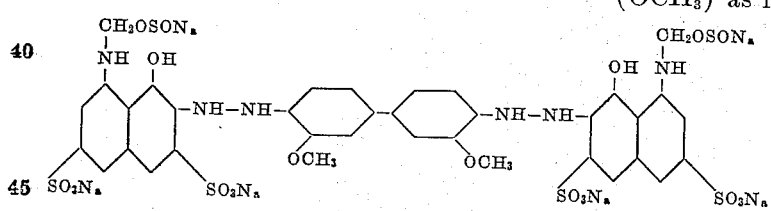

If less of the sodiumformaldehydesulphoxylate be used, but one of the $NH_2$ groups of the naphthalene residues will be transformed to the aminomethylenesulphoxylic acid group. After filtration the compound may be precipitated by ether and ethyl or methyl alcohol, washed with ether and dried in vacuum over paraffin and sulphuric acid. The yield is 35–40 gms. of powder.

In place of sodium in the sulphonic acid groups other metals, such as potassium, may be used. Similarly, other metals may be employed in place of sodium in the sulphoxylic group when the latter group is present.

The H-acid group may be replaced by other naphthalene derivatives containing salt forming groups, such as R, G, naphthionic or chromotropic acids, or trypan red or blue, etc. If the naphthalene derivatives do not contain any $NH_2$ groups, the corresponding methylenesulphoxylic acids or their salts are not formed, and in this case the reaction produces hydrazo compounds corresponding to the original di-azo compounds, along with some unchanged sodium-formaldehydesulphoxylate. As before pointed out, if more than one $NH_2$ group is present in the naphthalene derivatives, one or more of them may be transformed by the sodiumformaldehydesulphoxylate, depending upon the amount of the latter used.

The central group may consist of an unsubstituted diphenyl group, or one or more of its hydrogens may be replaced by oxymethyl ($OCH_3$) as in the preferred example, or by oxyethyl ($OC_2H_5$) or other oxyalkyl groups, also by acid radicals such as $SO_3H$, $COOH$, or their salts, or by hydroxyl (OH), or by halogens, or by combinations of the above or equivalent substituents.

The general formula for the new compounds therefore is

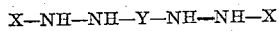

where X is a naphthalene group having a salt forming group in a side chain, and Y is a diphenyl group.

When either or both of the naphthalene groups contains one or more substituted sulphonic acid groups or their salts, the general formula becomes—

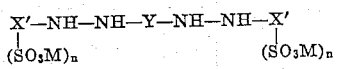

in which $X'$ is a naphthalene group, M is sodium or potassium and $n$ is one or two.

When either or both of the naphthalene groups of the original dye stuff contains in addition one or more $NH_2$ groups, one or more of these groups is transformed to the aminosulphoxylic acid group, and the formula becomes—

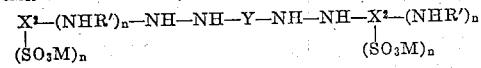

in which $X^2$ is a naphthalene group, $R'$ is hydrogen or a methylenesulphoxylic acid group or salt thereof, and $n$ is one or two.

When either or both of the naphthalene groups contains in addition one or more hydroxyl groups the formula becomes—

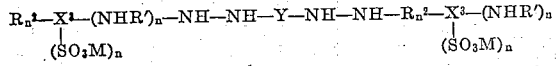

in which $X^3$ is a naphthalene group, $R^2$ is unsubstituted hydrogen or hydroxyl, and $n$ may be one or two.

When the central diphenyl group contains in addition one or more substitued elements or radicals the formula becomes—

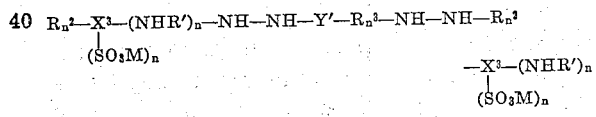

in which $Y'$ is a diphenyl group, $R^3$ is a substituted element or radical, and $n$ may be one or two.

When the napthalene groups are H-acid or its salts, and the substitutions in the diphenyl group are oxyalkyl, the formula becomes—

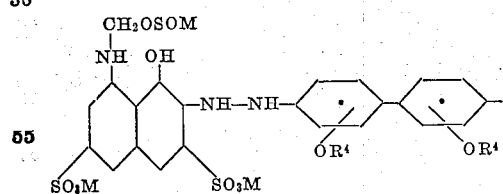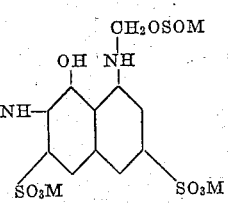

in which $R^4$ is alkyl and M is a metal.

The new compounds lack all dyeing properties, but although the skeleton of the dyes from which they are derived remains unchanged, they cannot be regarded as leuco-compounds, since under ordinary conditions they do not oxidize back to the original dye, and, when oxidized, dyestuffs of different qualities and colors from the originals are produced. The fact that they do not oxidize back to the original dyes is due to the presence of the radical of sodiumformaldehydesulphoxylate, which takes up the oxygen of the oxidizing agents and prevents the conversion of the hydrazo groups to the original azo groups.

As a starting material for the process either the impure dyestuffs may be used, as in the example, or a chemically pure starting compound may be synthesized or prepared from impure materials.

A valuable use for the new compounds is as therapeutic agents in the treatment of malaria (tertiana, quartana and perniciosa), relapsing typhus, and also intrypanozome infections in animals. When used medicinally, solutions may be made of the previously prepared dry material or fresh solutions direct from the reaction may be used.

If the previously prepared powdered material is used, it may be dissolved in water and injected intravenously in suitable dilution, as low as 1:200, but careful investigation has shown that it may be used in concentrations as great as 1:16 without injury.

Intsead of using the prepared material, it may be made up from the dyestuff shortly before use, filtered, and the solution injected as before described.

The following is given as an example of a method for preparing a fresh solution for medicinal use: 0.3 to 0.5 gms. of Amanil Skyblue R (520) are dissolved in 4 to 8 cc. of water. This solution is mixed with 0.4 to 0.65 gms. of pure sodiumformaldehydesulphoxylate and the mixture boiled in a flask over an open flame until the disappearance of the blue color of the dye. If the original benzidine dyestuff contains iron as impurity a brown sediment will form after decolorization. This may be removed by filtration, and as soon as sufficiently cool the solution may be intravenously injected as before described.

For medical use it is unnecessary to remove residual sulphoxylate, and in fact if the original dyestuff used is one which does not contain any $NH_2$ groups in its naphthalene residues the presence of some sulphoxylate or its equivalent is necessary to prevent oxidation, particularly if the solution is not to be used for several hours.

In the event that a chemically pure material free from sulphoxylate is desired, this may be obtained by repeated precipitation with ether and alcohol in the manner described in the first example.

It will be seen that whether $NH_2$ groups are present or absent in the naphthalene residues of the starting material, oxidation of the final hydrazo material back to a tetraazo compound is prevented, in the first case by the entry of the sulphoxylic acid group into the compound, and in the latter case by the presence of free residual sodiumformaldehydesulphoxylate.

A single injection of 0.3 gms. of the preferred material has frequently cut off some persistent form of malaria which would not respond to quinine or neosalvarsan treatment. Even a dose of only 0.2 grams of the compound prepared from the above described impure dyestuff, which is probably equivalent to no more than 0.18 gms. of the pure material, has cut off attacks of tropical malaria (febris intermittens perniciosa) in from 8 to 12 hours. Injections of 0.30 gms. cut off paroxysms of all varieties of malaria (tertiana, quartana and perniciosa). The plasmodia disappear and normal temperature is permanently established, sometimes in 8 to 12 hours after the injection. The spleen takes on its normal size, apathy disappears, the appetite improves, and the general condition markedly improves in 2 to 5 days. Acute cases respond to the treatment as well as chronic cases. In the treatment of relapsing typhus the addition of sodium citrate to the compound appreciably increases its therapeutic powers.

The preferred compound does not contain any heavy metals or toxic elements, such as mercury, arsenic, antimony, etc., and it therefore does not form any harmful deposits in the system. It has been used in malaria cases complicated by nephritis and even Addison's disease without complications. In paroxysms of newly contracted malaria (tropical and tertiana) the temperature as a rule becomes normal within 24 hours, and about this time the malaria parasites disappear from the patient's blood.

It is preferred, particularly in case where the compound is prepared from a chemically pure starting material, to combine the compound with a protective colloid when used medicinally. This not only reduces the toxicity of the compound but increases its spirochætocidal and trypanosomocidal powers. For example, 0.05 grams dextrin, gum arabic, gelatin, lisalbinic or protalbinic acid may be added to 1 gram of the compound in boiling water.

Having thus described my invention, what I claim and desire to protect by Letters Patent is:

1. A new compound of the general formula—

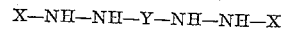

where X is a naphthalene group having a salt forming group in a side chain, and Y is a diphenyl group.

2. A new compound of the general formula—

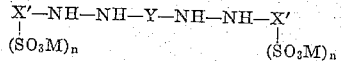

in which X' is a naphthalene group, Y is a diphenyl group, M is sodium or potassium, and $n$ is one or two.

3. A new compound of the general formula—

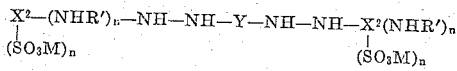

in which $X^2$ is a naphthalene group, Y is a diphenyl group, M is sodium or potassium, R' is hydrogen or a methylenesulphoxylic acid group or salt thereof, and $n$ is one or two.

4. A new compound of the general formula—

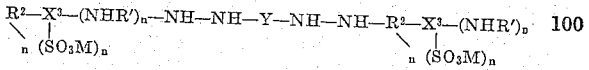

in which $X^3$ is a naphthalene group, Y is a diphenyl group, M is sodium or potassium, R' is hydrogen or a methylenesulphoxylic acid group or salt thereof, $R^2$ is unsubstituted hydrogen or hydroxyl, and $n$ may be one or two.

5. A new compound of the general formula—

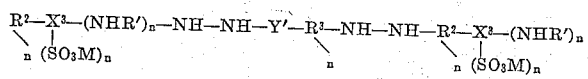

in which $X^3$ is a naphthalene group, Y' is a diphenyl group, M is sodium or potassium, R' is hydrogen or a methylenesulphoxylic acid group or salt thereof, $R^2$ is unsubstituted hydrogen or hydroxyl, $R^3$ is a substituted element or radical, and $n$ may be one or two.

6. A new compound of the general formula—

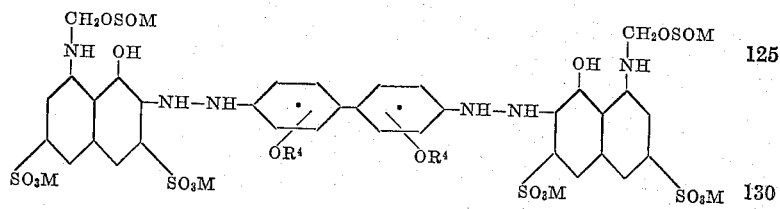

where M is sodium or potassium, and $R^4$ is alkyl.

7. A new compound of the formula—

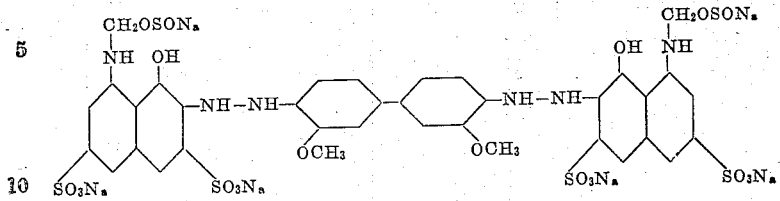

8. A medical preparation comprising the group—

where X is a naphthalene group having a salt forming group in a side chain and Y is a diphenyl group, and a methylenesulphoxylic group for preventing oxidation.

9. The method which comprises reducing to a hydrazo compound a tetra-azo dye in which a diphenyl group is linked by the nitrogen to naphthalene groups containing sulphonic acid groups, and maintaining the hydrazo compound against oxidation by the presence of a sulphoxylic acid group.

10. The method which comprises treating, a dye substance comprising a diphenyl group coupled by diazo groups with naphthalene groups containing salt forming groups, with an alkali metal formaldehydesulphoxylate in aqueous medium, until complete disappearance of dye coloring.

11. The process of preparing a medicinal substance which comprises coupling diazotized methoxy benzidine with H acid, heating the resulting azo dye with sodium formaldehydesulphoxylate, precipitating the colorless product by means of a suitable non-solvent for said product, and drying.

Signed at New York, New York, this 29th day of May, 1928.

IWAN OSTROMISLENSKY.